US006430724B1

(12) United States Patent
Laneman et al.

(10) Patent No.: US 6,430,724 B1
(45) Date of Patent: Aug. 6, 2002

(54) SOFT SELECTION COMBINING BASED ON SUCCESSIVE ERASURES OF FREQUENCY BAND COMPONENTS IN A COMMUNICATION SYSTEM

(75) Inventors: Jerry Nicholas Laneman, Cambridge, MA (US); Carl-Erik Wilhelm Sundberg, Chatham, NJ (US)

(73) Assignee: Agere Systems Guardian Corp., Orlando, FL (US)

(*) Notice: Subject to any disclaimer, the term of this patent is extended or adjusted under 35 U.S.C. 154(b) by 0 days.

(21) Appl. No.: 09/322,848

(22) Filed: May 28, 1999

(51) Int. Cl.[7] .............................................. H03M 13/00

(52) U.S. Cl. ...................................................... 714/780

(58) Field of Search ............................... 714/752, 758; 375/341, 136; 370/498

(56) References Cited

U.S. PATENT DOCUMENTS

| 5,463,641 A | 10/1995 | Doward et al. ............. 714/755 |
| 5,812,603 A | * 9/1998 | Luthi et al. .................. 375/287 |
| 5,949,796 A | * 9/1999 | Kumar ......................... 370/529 |

OTHER PUBLICATIONS

1. D. Sinha, J.D. Johnston, S. Dorward and S.R. Quackenbush, "The Perceptual Audio Coder,"in Digital Audio, Section 42, pp. 42–1 to 42–18, CRC Press, 1998.
2. N.S. Jayant and E.Y. Chen, "Audio Compression: Technology and Applications," AT&T Technical Journal, pp. 23–34, vol. 74, No. 2, Mar.–Apr. 1995.
3. J. Hagenauer, "Rate Compatible Punctured Convolutional Codes (RCPC Codes) and their Applications," IEEE Transactions on Communications, vol. 36, No. 4, pp. 389–400, Apr. 1988.
4. J. Hagenauer et al., "The Performance of Rate–Compatible Punctured Convolutional Codes for Digital Mobile Radio," IEEE Transactions on Communications, vol. 38, No. 7, pp. 966–980, Jul. 1990.

(List continued on next page.)

*Primary Examiner*—Albert Decady
*Assistant Examiner*—Shelly A Chase
(74) *Attorney, Agent, or Firm*—Ryan, Mason & Lewis, LLP (57) ABSTRACT

Techniques for processing received information in a communication system, such that performance is significantly improved in the presence of certain types of interference. In an illustrative embodiment, first and second digital sidebands are transmitted on either side of an FM or AM host carrier signal in a hybrid in-band on-channel (HIBOC) digital audio broadcasting (DAB) system. The compressed digital audio information in the sidebands is encoded using an outer code, e.g., a cyclic redundancy code (CRC), and an inner code, e.g., a complementary punctured pair convolutional (CPPC) code. A receiver generates an error indicator based at least in part on a first decoding of the received information. The error indicator characterizes interference associated with at least one of the digital sidebands. The receiver then generates at least one alternative decoding of the received information if the error indicator has a designated characteristic. For example, the receiver may generate the alternative decoding by eliminating from consideration in the receiver decoding process a designated portion of at least one of the digital sidebands. The error indicator may be indicative of the presence or absence of a first adjacent interference signal of a particular level within a frequency band associated with one of the sidebands, and may be based on, e.g., a signal-to-noise ratio measurement generated from a pilot tone associated with a given sideband, and/or an error flag generated using the CRC outer code. Portions of the given sideband may be eliminated from consideration via successive erasures of sideband components, i.e., subbands, thereby resulting in an increase in the effective code rate of the inner code.

27 Claims, 4 Drawing Sheets

OTHER PUBLICATIONS

5. R. V. Cox et al., "Sub–band Speech Coding and Matched Convolutional Channel Coding for Mobile Radio Channels," IEEE Transactions on Acoustics, Speech and Signal Processing, vol. 39, No. 8, pp. 1717–1731, Aug. 1991.

6. B. W. Kroeger and A.J. Vigil, "Improved IBOC DAB Technology for AM and FM Broadcasting," SBE Engineering Conference, pp. 1–10, 1996.

7. B. W. Kroeger and D. Cammarata, "Robust Modem and Coding Techniques for FM Hybrid IBOC DAB," IEEE Transactions on Broadcasting, vol. 43, No.4, pp. 412–420, Dec. 1997.

8. B. W. Kroeger and P.J. Peyla, "Compatibility of FM Hybrid In–Band On–Channel (IBOC) System for Digital Audio Broadcast," IEEE Transactions on Broadcasting, vol. 43, No. 4, pp. 421–430, Dec. 1997.

9. G.D. Forney, Jr., "Generalized Minimum Distance Decoding," IEEE Transactions on Information Theory, vol. IT–12, No. 2, pp. 125–131, Apr. 1996.

10. G. Einarsson et al., "A Note on Soft Decision Decoding with Successive Erasures," IEEE Transactions on Information Theory, pp. 88–96, Jan. 1976.

* cited by examiner

SOFT SELECTION COMBINING BASED ON SUCCESSIVE ERASURES OF FREQUENCY BAND COMPONENTS IN A COMMUNICATION SYSTEM

FIELD OF THE INVENTION

The present invention relates generally to digital audio broadcasting (DAB) and other techniques for transmitting and receiving information in a communication system.

BACKGROUND OF THE INVENTION

Proposed systems for providing digital audio broadcasting (DAB) in the FM radio band are expected to provide near CD-quality audio, data services, and more robust coverage than existing analog FM transmissions. However, until such time as a transition to all-digital DAB can be achieved, broadcasters require an intermediate solution in which the analog and digital signals can be transmitted simultaneously within the same licensed band. Such systems are typically referred to as hybrid, in-band on-channel (HIBOC) DAB systems, and are being developed for both the FM and AM radio bands.

In order to prevent significant distortion in conventional analog FM receivers, the digital signal in a typical FM HIBOC DAB system is, e.g., transmitted in two sidebands, one on either side of the analog FM host signal. Current FCC regulations require that the digital signal be transmitted. at a power level 25 dB below the host signal. A particularly significant source of interference in such a system is known as first adjacent analog FM interference. This interference results when a portion of an adjacent FM host carrier overlaps in frequency with a portion of a digital signal sideband. Current FCC regulations permit this type of interference to be up to 19 dB above the digital signal.

Although first adjacent analog FM interference, when present, typically affects only one of the two digital sidebands, it nonetheless represents a limiting factor on the performance of DAB systems. If conventional equal gain combining is used to process the digital signals of the two sidebands, the presence of a strong first adjacent interference signal will significantly degrade the performance of the digital signal transmission, even when one of the two sidebands is free from interference. A combined channel code in this case is overwhelmed by the high interference level in one sideband. A known approach which may be viewed as "hard selection combining" simply erases or discards the entire interfered-with sideband in the presence of a strong first adjacent interference signal, and uses only the other sideband. However, such a solution is less than optimal in that it discards an entire sideband, even though only a relatively small portion of that sideband may be affected by the interference. Additional techniques are therefore needed for providing improved DAB system performance in the presence of first adjacent interference and other similar types of interfering signals.

SUMMARY OF THE INVENTION

The present invention provides methods and apparatus for processing received information in digital audio broadcasting (DAB) and other communication system applications; in the presence of non-uniform interference. The received information may be, e.g., digitized audio, video or image information, data, or combinations of these and other types of information. In an illustrative embodiment, first and second digital sidebands are transmitted on either side of an FM or AM host carrier signal in a hybrid in-band on-channel (HIBOC) DAB system. The compressed digital audio information in the sidebands is encoded using an outer code, e.g., a cyclic redundancy code (CRC), and an inner code, e.g., a complementary punctured pair convolutional (CPPC) code. A receiver generates an error indicator based at least in part on a first decoding of the received information. The error indicator characterizes interference associated with at least one of the digital sidebands. The receiver then generates at least one alternative decoding of the received information if the error indicator has a designated characteristic. For example, the receiver may generate such an alternative decoding by eliminating from consideration in the receiver decoding process a designated portion of at least one of the digital sidebands.

The error indicator in the illustrative embodiment may be indicative, of the presence or absence of a first adjacent interference signal of a particular level within a frequency band associated with one of the sidebands, and may be based on, e.g., a signal-to-noise ratio measurement generated from a pilot tone associated with a given sideband, an error flag generated using the CRC outer code, statistics relating to the generation of CRC error flags in a particular part of the sideband over time, or a combination of these and other indicators. Portions of the given sideband may be eliminated from consideration via successive erasures of sideband components, i.e., subbands, starting from a component nearest the interference, thereby resulting in an increase in the effective code rate of the inner code. If none of the successive erasures satisfy the CRC, the error flag may be used to trigger an error mitigation algorithm in a corresponding audio decoder.

The invention can be applied to other types of digital information, including, for example, data, video and image information. In addition, the invention may be implemented in numerous applications other than FM and AM HIBOC DAB systems, such as Internet and satellite broadcasting systems, systems for simultaneous delivery of audio and data, etc. Alternative embodiments of the invention can utilize other types of outer codes, other types of inner codes, various types of interleaving, e.g., block interleaving, convolutional interleaving or random interleaving, and a wide variety of different frame formats, including TDM, FDM or CDM frame formats. Moreover, the invention is applicable not only to perceptual coders but also to other types of source encoders using other compression techniques over a wide range of bit rates.

DETAILED DESCRIPTION OF THE INVENTION

The invention in the illustrative embodiment to be described below provides exemplary soft selection combining techniques for use in the reception of audio information bits, e.g., compressed audio bits generated by an audio coder such as a perceptual audio coder (PAC), in the presence of non-uniform interference. It should be understood, however, that the soft selection combining techniques of the invention may be applied to many other types of information, e.g., video or image information, and other types of coding devices. In addition, the invention may be utilized in a wide variety of different types of communication applications, including communications over the Internet and other computer networks, and over cellular multimedia, satellite, wireless cable, wireless local loop, high-speed wireless access and other types of communication systems. The invention may be utilized with any desired type of communication channel or channels, such as, for example, frequency channels, time slots, code division multiple access (CDMA) slots, and virtual connections in asynchronous transfer mode (ATM) or other packet-based transmission systems.

The terms "erasure" and "erase" as used herein as applied to a component of a digital sideband refer generally to the elimination of at least a substantial portion of the information content of that component from consideration in the decoding process. This elimination results in an alternative decoding which may be utilized to generate a reconstructed signal in a receiver. The term "error indicator" is intended to include, e.g., a signal-to-noise ratio measurement generated from a pilot tone associated with a given digital sideband, an error flag generated using the CRC outer code, statistics relating to the generation of CRC error flags in a particular part of the sideband over time, or a combination of these and other indicators of the presence of interference.

Figure 1:
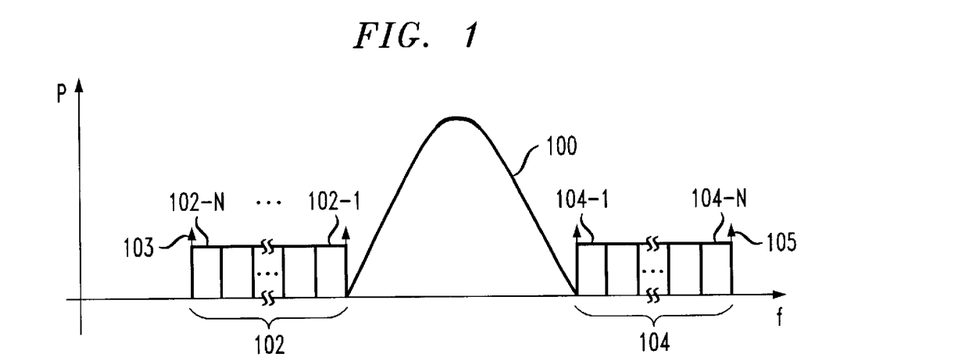
FIG. 1 shows a portion of a frequency spectrum of a hybrid, in-band on-channel (HIBOC) digital audio broadcasting (DAB) system in accordance with the invention.

FIG. 1 illustrates a portion of a frequency spectrum in an exemplary FM HIBOC DAB system. The spectrum is plotted as power P as a function of frequency f. The portion of the spectrum shown includes an analog host FM signal 100 with associated lower digital sideband 102 and upper digital sideband 104. The sidebands represent portions of the frequency spectrum used to transmit digital audio information in the HIBOC DAB system. In the illustrative embodiment of the invention, the DAB system uses as an inner code a complementary punctured pair convolutional (CPPC) code with optimum bit placement (OBP) in the digital sidebands 102, 104. CPPC codes and OBP techniques suitable for use in the systems of the invention are described in, e.g., U.S. patent application Ser. No. 09/217,655, filed Dec. 21, 1998 in the name of inventors Brian Chen and Carl-Erik W. Sundberg and entitled "Optimal Complementary Punctured Convolutional Codes," which is assigned to the assignee of the present application and incorporated by reference herein. More specifically, the illustrative embodiment uses a pair of rate-4/5, memory M=6 CPPC codes for the two sidebands, yielding a combined rate-2/5 code. The bit placement is optimized for the case in which the outermost frequency components are expected to be the sideband components most susceptible to first adjacent interference. Although illustrated herein with CPPC codes, the invention can be utilized with other code arrangements, e.g., classic code combining with OBP.

The system in the illustrative embodiment uses an outer cyclic redundancy code (CRC), and differential quadrature phase shift keyed (DQPSK)/OFDM modulation. The DQPSK modulation of transmitted symbols provides robustness to frequency-selective fading and oscillator phase drift. The differential encoding is performed in frequency between OFDM tones. The digital signal to be transmitted and the outer CRC block code are repeated in each of the sidebands 102, 104. As shown in FIG. 1, each of the sidebands 102, 104 include N components, 102-1, 102-2, . . . 102-N, and 104-1, 104-2, . . . 104-N, respectively. The components may represent, e.g., sets of orthogonal frequency division multiplexed (OFDM) carriers. In this embodiment, ten separate frequency components are used for the rate-2/5 code, i.e., N=5. These frequency components correspond generally to subbands of the corresponding sideband, i.e., in the rate-2/5 case, each sideband has five subbands. Pilot tones 103 are present at either end of the sideband 102, and pilot tones 105 are present at either end of the sideband 104. Additional pilot tones, which are not shown, may be present elsewhere in the portion of the frequency spectrum shown. The pilot tones 103, 105 correspond to selected OFDM reference tones, and may be used to determine the presence of interference, as will be described in greater detail below.

Figure 2:
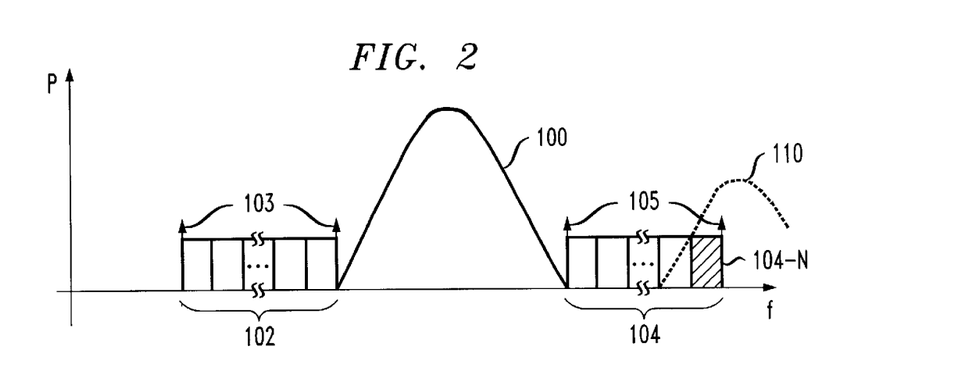
FIGS. 2 and 3 illustrate successive erasures of portions of a digital sideband in the FIG. 1 frequency spectrum, in the presence of a first adjacent interference signal, in accordance with an exemplary soft selection combining technique of the invention.

FIG. 2 shows a strong first adjacent FM interference signal 110 in the upper sideband 104 of the HIBOC DAB system in the illustrative embodiment. The first adjacent interference signal 110 in this case overlaps in frequency with a portion of the upper sideband 104 as shown. As previously noted, if conventional equal gain combining is used, the presence of the first adjacent interference signal 110 will significantly degrade the performance of the digital signal transmission. The approach referred to above as "hard selection combining" would simply erase or otherwise discard the entire upper sideband 104 in the presence of the first adjacent interference signal 110, and use only the half-rate CPPC code of the other sideband.

The present invention provides an approach which is referred to herein as "soft selection combining." In accordance with this approach, portions of a digital sideband which are "contaminated" with first adjacent interference are successively erased or otherwise discarded until a CRC check is satisfied. As a result, portions of the affected sideband can be used even in the presence of the first adjacent interference, such that the performance of the DAB system is significantly improved.

The soft selection combining of the present invention first establishes the presence of a first adjacent interference signal on one side of the analog host FM signal 100. This determination may be based on measurement of signal-to-noise ratio (SNR) for a given one of the pilot tones associated with each of the digital sidebands 102, 104. For example, referring to FIG. 2, a measurement of a particular SNR for the pilot tone 105 near component 104-N of the upper digital sideband 104, relative to an SNR for one or more of the other pilot tones, can be used to indicate the presence of the first adjacent interference signal 110. CRC checks are then made for a demodulated and decoded output generated from the digital sidebands 102, 104. In the event that a CRC check is not satisfied in the presence of the first adjacent interference signal 110, components 104-i from the upper sideband 104 are successively erased starting from the end of the sideband nearest the identified first adjacent interference signal 110, and the CRC is rechecked, until a satisfactory CRC check is achieved.

For example, as shown in FIG. 2, the component 104-N of upper sideband 104 is the first component erased after detection of the first adjacent interference signal 110 and a failed CRC check. The component 104-N is shaded to indicate that it has been erased. The digital signal is then demodulated and decoded using the lower sideband 102 and only the remaining components of the upper sideband 104, using, e.g., conventional equal gain combining or a suboptimal soft weighting technique such as energy weighting. An example of an energy weighting technique of this type may make use of estimates of the interference levels in determining the weights to be applied.

Figure 3:
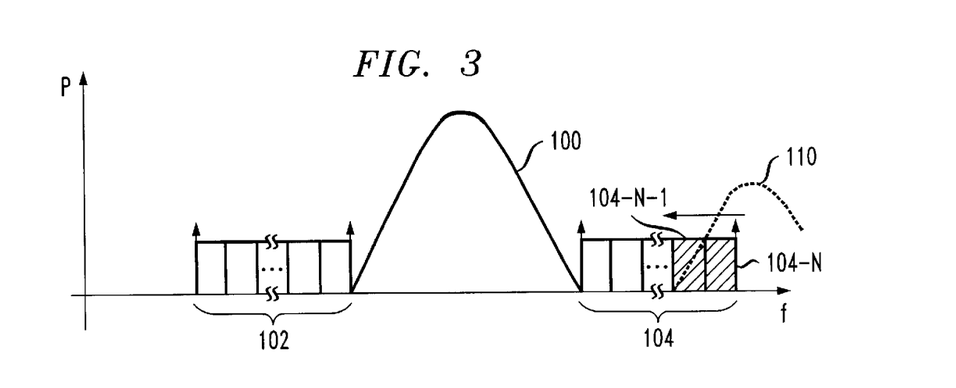

If the next CRC check passes, the demodulation and decoding continues with the reduced portion of the upper sideband, until such time that the first adjacent interference signal is significantly increased or decreased in strength, e.g., as indicated by pilot tone SNR measurements. If the next CRC check after erasure of the first component 104-N does not pass, additional components of the upper sideband 104 are erased, such as component 104-N-1 as shown in FIG. 3, moving in a direction inward toward the host analog FM signal 100 from the outermost component 104-N. Again, the erased components are shown as shaded in FIG. 3. The process continues until a satisfactory CRC check is achieved using only a portion of the upper sideband, or until such time as the entire sideband is erased, resulting in the previously-described hard selection combining case. In the event that the successive erasures fail to satisfy the CRC check, a CRC error flag may be used to trigger an error mitigation algorithm in the corresponding audio decoder.

The successive erasure process in the illustrative embodiment may be viewed as a further puncturing of the rate-2/5 CPPC code. The resulting codes may be denoted as rate-4/k codes, where k=9, 8, 7 or 6 upon successive erasures of each of the first four of five components in the rate-2/5 illustrative embodiment. A value of K=10 corresponds to no erasures, i.e., the original combined rate-2/5 code, and a value of K=5 corresponds to erasure of a full sideband, i.e., the original single-sideband rate-4/5 code. The successive erasures thus correspond to successive increases in the effective combined code rate, from the original rate-2/5 (K=10, no erasures) to rate-2/3 (K=6, erasure of four of five components). It should be noted that there is no rate normalization for these higher rate codes. The transmitted energy per bit remains the same, but the receiver actually ignores some of this energy in highly corrupted components of a given one of the sidebands.

The pilot tone SNR measurements may be repeated at regular intervals in order to determine whether the first adjacent interference signal is still present, or whether it has been reduced in strength or appeared in another portion of the spectrum. If an indication is received that the first adjacent interference signal is no longer present or significantly reduced in strength, the previously-erased components of the upper sideband 104 may again be used in the demodulation and decoding process. If an indication is received that a first adjacent interference signal is present in the lower sideband 102, a process similar to that described above for sideband 104 may be implemented to provide successive erasures of the components of sideband 102. As previously noted, first adjacent FM interference generally affects only one of the two sidebands at any particular time. However, it should be understood that in embodiments of the invention in which it is possible to have interfering signals present in both sidebands simultaneously, the above-described successive component erasure process may be performed simultaneously on both sidebands.

Figure 4:
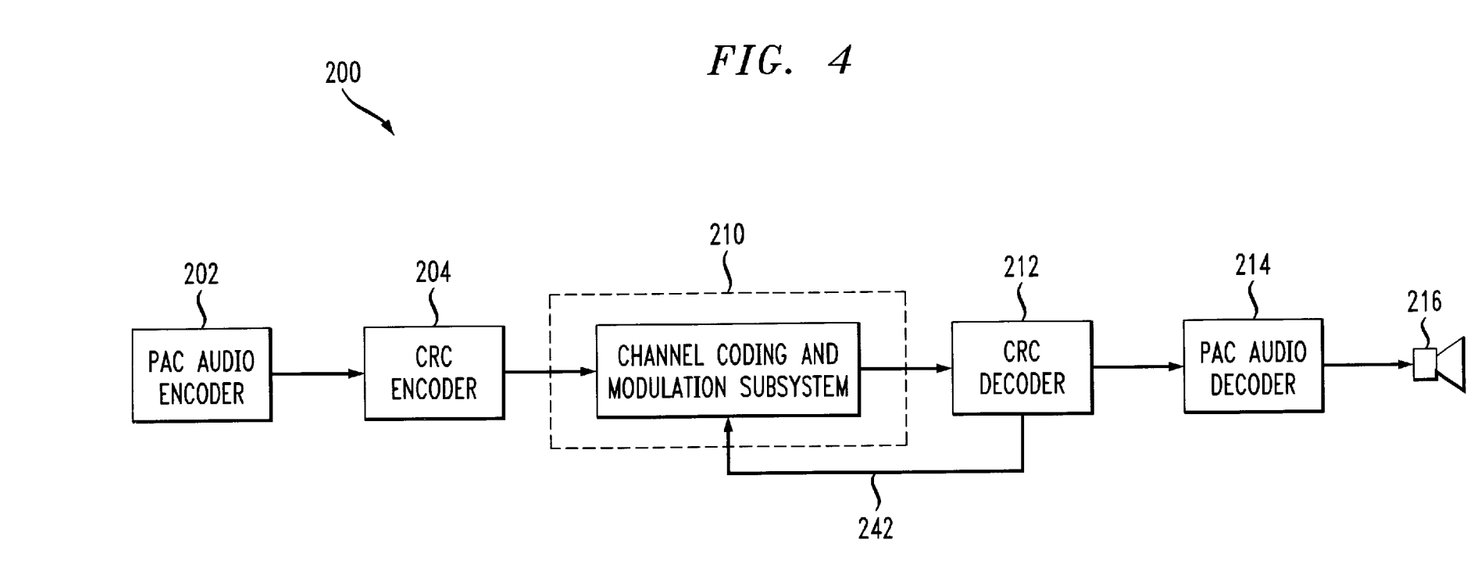
FIG. 4 is a block diagram of a HIBOC DAB system in which the invention may be implemented.

FIG. 4 shows an exemplary FM HIBOC DAB system 200 in which the invention may be implemented. The system 200 includes a transmitter and a receiver. It should be noted that FIG. 4 shows only the digital portion of the system, i.e., the portions associated with generation and processing of the digital signals. Additional conventional processing elements may be used to process the analog signals. A PAC audio coder 202 generates an encoded audio signal at a bit rate of 96 kbps using the audio compression techniques described in, e.g., D. Sinha, J. D. Johnston, S. Dorward and S. R. Quackenbush, "The Perceptual Audio Coder," in Digital Audio, Section 42, pp. 42-1 to 42-18, CRC Press, 1998, which is incorporated by reference herein. The encoded audio bit stream is applied to a CRC encoder 204, which generates CRC bits in a conventional manner using a CRC error detecting block code, and then to a channel coding and modulation subsystem 210. The CRC is an example of one type of "outer code" that may be used in the system 200. Other possible outer codes include, e.g., Reed-Solomon (RS) codes, Bose-Chadhuri-Hocquenghem (BCH) codes, and other block codes.

Figure 5:
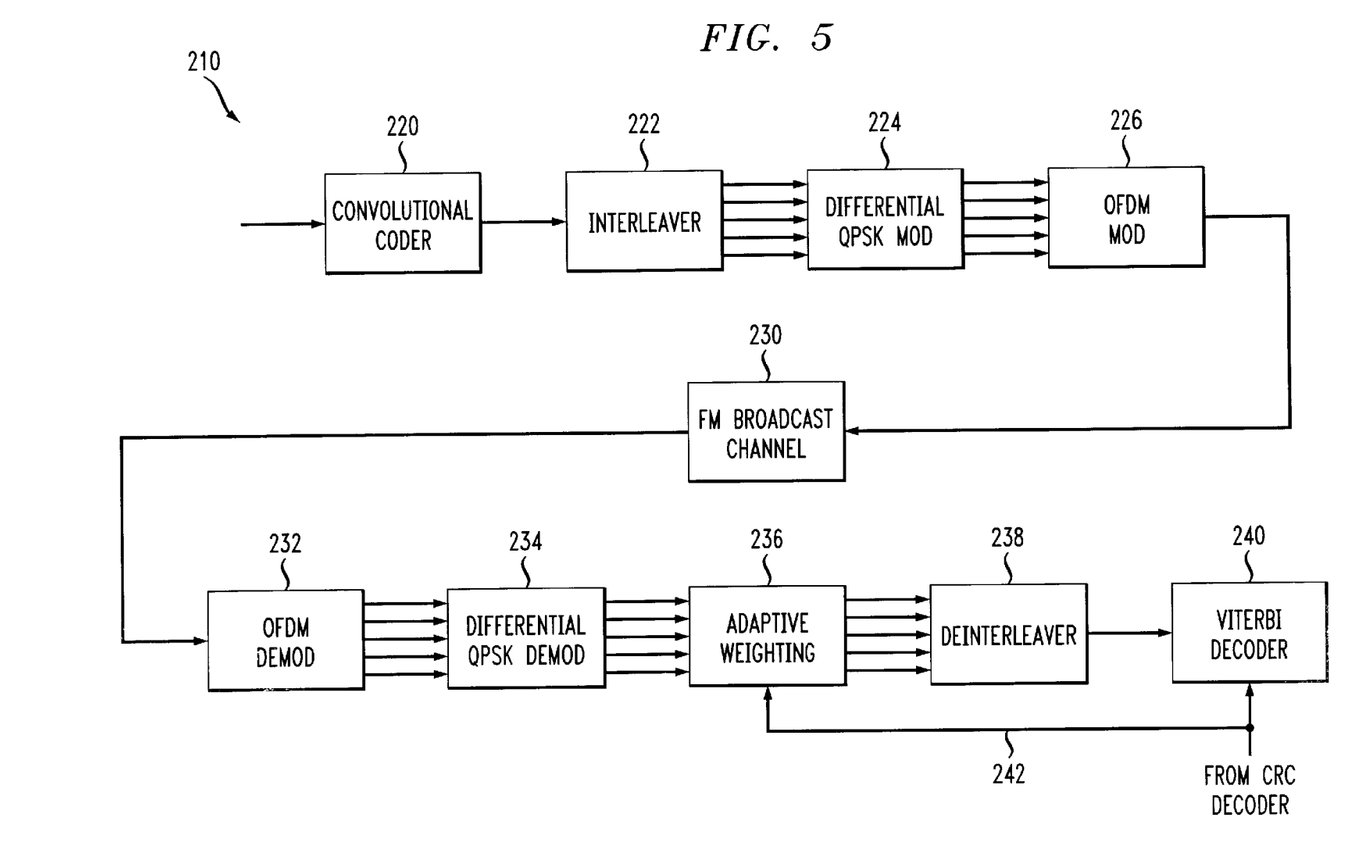
FIG. 5 is a block diagram showing a more detailed view of a channel coding and modulation subsystem of the FIG. 4 HIBOC DAB system.

As shown in FIG. 5, the subsystem 210 performs channel coding, modulation, transmission, reception, demodulation and channel decoding operations. It is assumed for purposes of illustration that the subsystem 210 includes an FM broadcast channel 230 over which the HIBOC DAB signals are transmitted. The subsystem 210 of FIG. 5 comprises a transmitter portion including a convolutional coder 220, e.g., a CPPC coder for coding the audio bitstream in accordance with the above-noted CPPC techniques, an interleaver 222, a DQPSK modulator 224, and an OFDM modulator 226. The convolutional coding in coder 220 is an example of a type of "inner code" that may be used in the system 200. Other types of inner codes may also be used, including block or convolutional codes, so-called "turbo" codes, and coding associated with trellis coded modulation. The modulated output of the OFDM modulator 226, which corresponds to the digital sidebands 102 and 104, is transmitted through the FM broadcast channel 230 to a receiver portion including an OFDM demodulator 232, a DQPSK demodulator 234, an adaptive weighting unit 236, a deinterleaver 238, and a Viterbi decoder 240.

The adaptive weighting unit 236 is used to implement the above-described successive erasures of sideband components, e.g., by applying zero weights to the component or components to be erased. The adaptive weighting unit 236 may also be used to implement the above-noted soft weighting technique for the components with non-zero weights. It should be understood that numerous other techniques may be used to implement component erasures of this type.

Referring again to FIG. 4, the demodulated and decoded received signal from the receiver portion of the subsystem 210 is applied to a CRC decoder 212, and then to a PAC audio decoder 214. The CRC decoder 212 generates an error flag which is supplied via output 242 to the Viterbi decoder 240 and adaptive weighting unit 236 of FIG. 5 and used to implement the above-described successive erasure process. The error flag may also be used to trigger conventional error mitigation processes in the PAC audio decoder 214. For example, if the successive erasures fail to result in a satisfactory CRC check, an error mitigation algorithm in decoder 214 may be triggered. The reconstructed audio signal from decoder 214 is applied to an output device 216, e.g., a speaker or set of speakers, for conversion to an audibly-perceptible form.

The Viterbi decoder 240 of FIG. 5 may utilize a so-called "short list" type of List Viterbi decoding, in which the CRC error flag supplied via output 242 is used for selection of alternative paths. The list size in the illustrative embodiment is preferably on the order of, e.g., two, three or four entries. The short list is acceptable because first adjacent interference signals in typical FM HIBOC DAB systems generally lead to slowly changing interference levels, e.g., as a receiver in an automobile moves within an area with a first adjacent interference signal. Furthermore, it will generally be desirable for a given erased component to remain erased over a number of CRC frames. The exact list sizes and number of component erasures may be established using simulations, as will be apparent to those skilled in the art.

Figure 6:
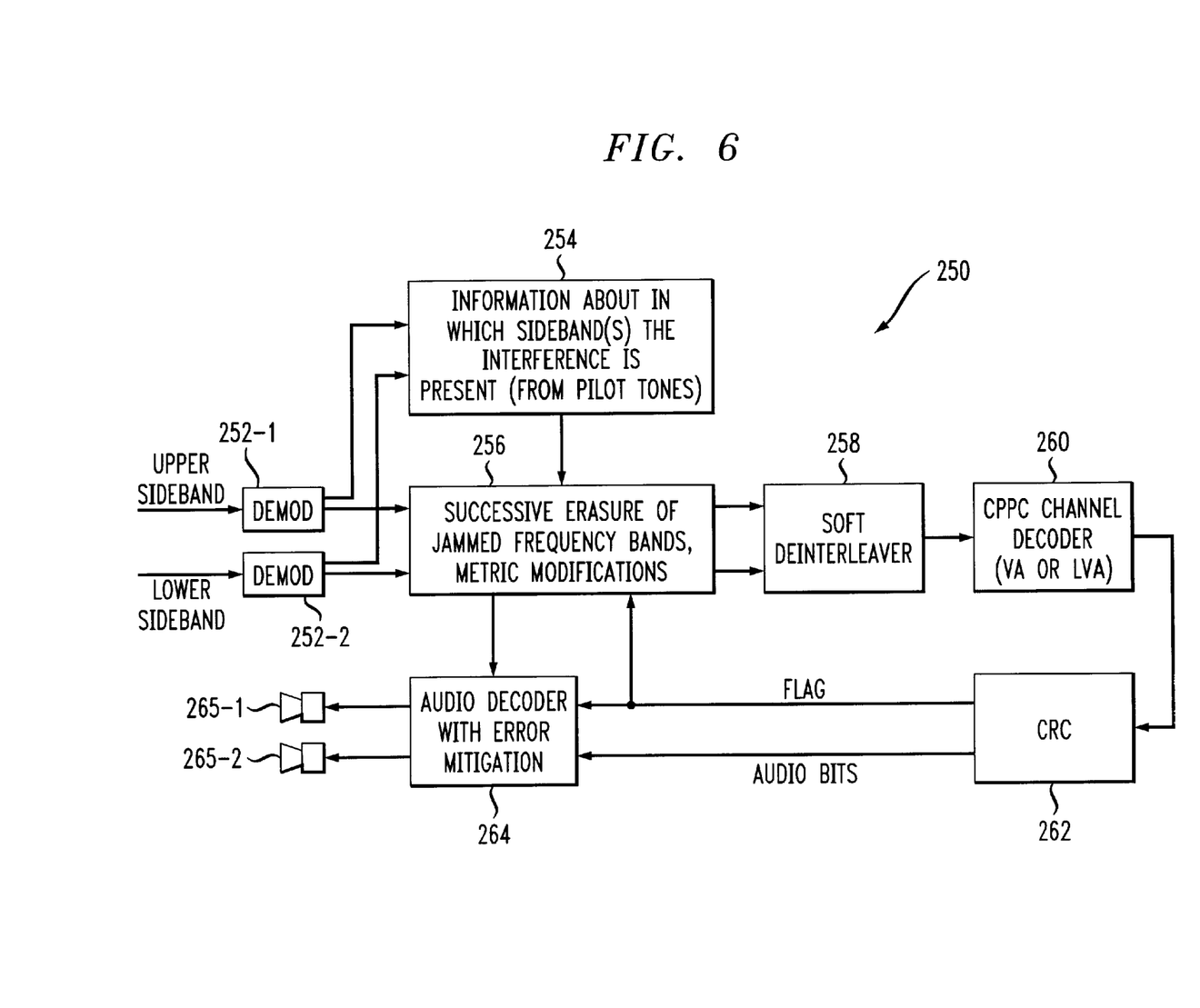
FIG. 6 is a functional block diagram of a receiver with soft selection combining in accordance with the invention.

FIG. 6 shows a more detailed functional block diagram of a portion of a receiver 250 with soft selection combining in accordance with the illustrative embodiment of the invention. The receiver 250 corresponds generally to elements 232, 234, 236, 238 and 240 of FIG. 5. Upper and lower sideband portions of a received signal are applied to OFDM/DQPSK demodulators 252-1 and 252-2, respectively. The demodulators 252-1, 252-2 provide information 254 about in which sideband(s) the interference is present. This information may be generated, e.g., by SNR measurements taken on the pilot tones, as previously described. The demodulated signal outputs of the demodulators 252-1, 252-2 are applied to a successive erasure unit 256 which implements successive erasures of components of the jammed upper and/or lower sidebands. The successive erasure unit 256, which may be in the form of an adaptive weighting unit, may also provide suitable metric modifications in order to implement the above-noted soft weighting technique for the sideband components with non-zero weights. The outputs of the successive erasure unit 256 are applied to a soft deinterleaver 258.

The output of the deinterleaver 258 is applied to a CPPC channel decoder 260. The decoder 260 applies a conventional Viterbi algorithm (VA) or List Viterbi algorithm (LVA) to the sideband components as received from the deinterleaver 258. The output of decoder 260 is supplied to a CRC decoder 262. The CRC decoder 262 generates an error flag which is supplied along with decoded audio bits to an audio decoder 264. The error flag is supplied to the successive erasure unit 256, and used in the sideband component erasure process in the manner previously described. The error flag is also used by audio decoder 264 to perform conventional error mitigation, e.g., if no arrangement of successive erasures in unit 256 results in a satisfactory CRC check. The reconstructed audio output of the audio decoder 264 is applied to speakers 265-1 and 265-2.

The operation of the receiver 250 of FIG. 6 is as follows. The generation of an error flag from the outer CRC block code indicates an error in the corresponding audio block. If, when such an error is present, the pilot tones indicate the presence of an adjacent channel interference signal, e.g., in the upper sideband, the bits corresponding to the tones in the outermost subband of that sideband are erased by the successive erasure unit 256. Metric values used for adaptive weighting may then be modified in the successive erasure unit as if a rate-4/9 CPPC code had been received, rather than the rate-4/10 code associated with the full band. Another decoding attempt is then made. If the CRC is now satisfied, the block of audio bits is passed on to the audio decoder 264, and decoded to generate a reconstructed audio signal.

If the CRC is not satisfied, further erasures are performed, generating successive codes at rate-4/8, rate-4/7, etc. In principle, successive erasure decoding with up to ten attempts can be done for all blocks. However, it will generally be more efficient to operate the receiver such that a few likely alternatives are generated by the successive erasures, based on the pilot tone indications of the presence and strength of the first adjacent interference signal. If none of these alternatives satisfy the CRC, then the error mitigation capability of the audio decoder is triggered. As previously noted, the successive erasure techniques of the invention can be combined with LVAs in a straightforward manner to further improve decoding efficiency. Moreover, although illustrated using CPPC inner codes, the invention can be used with identical inner codes on both the upper and lower sidebands. As another alternative, soft combiner weights, rather than a complete erasure, may be used in the sideband components identified for erasure. It is also possible for the component erasures to be non-successive, e.g., components can be erased at different points in a given digital sideband, rather than in order from the outermost component as in the illustrative embodiments. Moreover, in other embodiments of the invention, e.g., embodiments without a host carrier signal, components may be erased from starting with a component which is on a designated end of a particular frequency band in which interference is present.

It should also be noted that other embodiments of the invention may utilize different techniques for triggering the successive erasures. For example, the erasures from a given sideband may be triggered without measurement of a pilot signal SNR, i.e., may be based solely on an error flag generated by the CRC decoder. In other embodiments, the CRC or other type of outer code may be eliminated, and the system could rely on an error flag generated by the PAC decoder to control the successive erasure process. The invention can also be implemented in systems which include a first interference canceller, e.g., systems in which there is some residual interference despite the presence of the canceller.

The embodiments illustrated in FIGS. 4–6 may include additional processing elements, such as modulators, multiplexers, upconverters and the like, which are not shown for simplicity of illustration. In addition, these embodiments may be implemented using other arrangements of elements, including elements other than those shown. For example, the order of various operations, such as the successive erasure and deinterleaving operations in FIGS. 5 and 6, may be reversed in alternative embodiments. Moreover, certain signal processing elements, such as the coders and decoders, may be implemented at least in part using one or more application-specific integrated circuits, microprocessors or other types of digital data processors, as well as portions or combinations of these and other known devices. Elements of the illustrative embodiments may also be implemented in the form of one or more software programs executed by a central processing unit (CPU) or the like in a digital data processor.

The above-described soft selection combining techniques may be utilized in conjunction with UEP techniques such as those described in U.S. patent application Ser. No. 09/022,114, filed Feb. 11, 1998 in the name of inventors Deepen Sinha and Carl-Erik W. Sundberg, and entitled "Unequal Error Protection For Perceptual Audio Coders," and U.S. patent application Ser. No. 09/163,656, filed Sep. 30, 1998 in the name of inventors Deepen Sinha and Carl-Erik W. Sundberg, and entitled "Unequal Error Protection for Digital Broadcasting Using Channel Classification."

Alternative embodiments of the invention can utilize other types of outer codes, e.g., RS, BCH or other block codes, other types of inner codes, e.g., various types of convolutional codes, turbo codes, or coding associated with trellis coded modulation, and a variety of different types of interleaving, e.g., block interleaving, convolutional interleaving, or random interleaving. The alternative embodiments could also utilize only an inner code and no outer code, or vice-versa. Embodiments which utilize an RS, BCH or other similar type of error correcting outer code can of course use the code for error correction as well as for generation of an error flag for controlling successive erasures and PAC error mitigation.

Although illustrated in the context of frequency division multiplexing (FDM), the invention can also be applied to decoding of a wide variety of frame formats, including time division multiplexed (TDM) and code division multiplexed (CDM) formats, as well as combinations of TDM, FDM, CDM and other types of frame formats. Furthermore, although not described in detail herein, numerous different types of modulation techniques may be used in conjunction with the invention, including, e.g., single-carrier modulation in every sideband component, or multi-carrier modulation, e.g., OFDM, in every sideband component. A given carrier can be modulated using any desired type of modulation technique, including, e.g., a technique such as m-QAM, m-PSK or trellis coded modulation.

It should be noted that the invention can be used with a wide variety of other types and arrangements of frequency spectra, e.g., spectra with a single frequency band and no host carrier signal, spectra with more than two sidebands, etc. The invention can also be used with a variety of different types of non-uniform interference, e.g., time-dependent interference, time- and frequency-dependent interference, etc.

As previously noted, the invention can be applied to the transmission of digital information other than audio, such as data, video, images and other types of information. Although the illustrative embodiments use audio packets, such as those generated by a PAC encoder, the invention is more generally applicable to digital information in any form and generated by any type of compression technique. The invention may be implemented in numerous applications, such as simultaneous multiple program listening and/or recording, simultaneous delivery of audio and data, etc. These and numerous other alternative embodiments and implementations within the scope of the following claims will be apparent to those skilled in the art.

What is claimed is:

1. A method of processing received information corresponding to at least one frequency band in a communication system, the method comprising the steps of:
   generating an error indicator based at least in part on a first decoding of the received information and characterizing interference associated with at least a portion of the frequency band;
   generating at least one alternative decoding of the received information if the error indicator has a designated characteristic;
   wherein the received information includes an information signal encoded using an outer code and an inner code; and
   wherein the at least one alternative decoding is generated by eliminating from consideration in a receiver decoding process one or more subbands of a digital sideband associated with the frequency band, such that the alternative decoding results in an increase in an effective code rate of the inner code.

2. The method of claim 1 wherein the at least one frequency band comprises at least first and second digital sidebands of a host carrier signal in the communication system.

3. The method of claim 2 wherein the at least one alternative decoding of the received information is generated by eliminating from consideration in a receiver decoding process a designated portion of at least one of the digital sidebands.

4. The method of claim 2 wherein the host carrier signal is an analog FM host signal.

5. The method of claim 2 wherein the host carrier signal is an analog AM host signal.

6. The method of claim 2 wherein the inner code is a complementary punctured pair convolutional code for each of the first and second digital sidebands, and the at least one alternative decoding is generated by erasing information in components of at least one of the sidebands, starting from an outermost component of the at least one sideband.

7. The method of claim 1 wherein the error indicator is indicative of the presence or absence of an interference signal of a particular level within the frequency band.

8. The method of claim 7 wherein the interference signal is a first adjacent interference signal relative to a host carrier signal in the communication system.

9. The method of claim 1 wherein the error indicator comprises a signal-to-noise ratio measurement generated from a pilot tone associated with the frequency band.

10. The method of claim 1 wherein the error indicator comprises an error flag generated using a block code in the received information.

11. An apparatus for processing received information corresponding to at least one frequency band in a communication system, the apparatus comprising:
    a receiver operative to generate an error indicator based at least in part on a first decoding of the received information and characterizing interference associated with at least a portion of the frequency band, and to generate at least one alternative decoding of the received information if the error indicator has a designated characteristic;
    wherein the received information includes an information signal encoded using an outer code and an inner code; and
    wherein the at least one alternative decoding is generated by eliminating from consideration in a receiver decoding process one or more subbands of a digital sideband associated with the frequency band, such that the alternative decoding results in an increase in an effective code rate of the inner code.

12. The apparatus of claim 11 wherein the at least one frequency band comprises at least first and second digital sidebands of a host carrier signal in the communication system.

13. The apparatus of claim 12 wherein the at least one alternative decoding of the received information is generated by eliminating from consideration in a receiver decoding process a designated portion of at least one of the digital sidebands.

14. The apparatus of claim 12 wherein the host carrier signal is an analog FM host signal.

15. The apparatus of claim 12 wherein the host carrier signal is an analog AM host signal.

16. The apparatus of claim 12 wherein the inner code is a complementary punctured pair convolutional code for each of the first and second digital sidebands, and the receiver generates the at least one alternative decoding by erasing information in components of at least one of the sidebands, starting from an outermost component of the at least one sideband.

17. The apparatus of claim 11 wherein the error indicator is indicative of the presence or absence of an interference signal of a particular level within the frequency band.

18. The apparatus of claim 17 wherein the interference signal is a first adjacent interference signal relative to a host carrier signal in the communication system.

19. The apparatus of claim 11 wherein the error indicator comprises a signal-to-noise ratio measurement generated from a pilot tone associated with the frequency band.

20. The apparatus of claim 11 wherein the error indicator comprises an error flag generated using a block code in the received information.

21. A receiver for processing received information corresponding to at least one frequency band in a communication system, the frequency band being encoded with an outer code and an inner code, the receiver comprising:

an inner code decoder having an input adapted to receive demodulated components of the frequency band, the inner code decoder decoding at least a portion of the inner code of the frequency band; and     an outer code decoder having an input coupled to an output of the inner code decoder, the outer code decoder generating an error indicator characterizing interference associated with at least a portion of the frequency band;

wherein, based at least in part on the error indicator, a designated portion of the frequency band is eliminated from consideration in a decoding process of the inner code decoder.

22. The receiver of claim 21 wherein the at least one frequency band comprises at least first and second digital sidebands of a host carrier signal in the communication system.

23. The receiver of claim 22 wherein the inner code is a complementary punctured pair convolutional code for each of the first and second digital sidebands, and the receiver eliminates designated portions of the at least one of the sidebands from consideration by erasing information in components of that sideband, starting from an outermost component of that sideband, such that the erasing operation results in an increase in an effective code rate of the inner code.

24. A method of processing received information corresponding to at least one frequency band in a communication system, the method comprising the steps of:

generating an error indicator based at least in part on a first decoding of the received information and characterizing interference associated with at least a portion of the frequency band; and     generating at least one alternative decoding of the received information if the error indicator has a designated characteristic;

wherein the at least one frequency band comprises at least first and second digital sidebands of a host carrier signal in the communication system;

wherein the received information includes an information signal encoded using at least one of an outer code and an inner code; and     wherein the inner code is a complementary punctured pair convolutional code for each of the first and second digital sidebands, and the at least one alternative decoding is generated by erasing information in components of at least one of the sidebands, starting from an outermost component of the at least one sideband, such that the alternative decoding results in an increase in an effective code rate of the inner code.

25. An apparatus for processing received information corresponding to at least one frequency band in a communication system, the apparatus comprising:

a receiver operative to generate an error indicator based at least in part on a first decoding of the received information and characterizing interference associated with at least a portion of the frequency band, and to generate at least one alternative decoding of the received information if the error indicator has a designated characteristic;

wherein the at least one frequency band comprises at least first and second digital sidebands of a host carrier signal in the communication system;

wherein the received information includes an information signal encoded using at least one of an outer code and an inner code; and     wherein the inner code is a complementary punctured pair convolutional code for each of the first and second digital sidebands, and the receiver generates the at least one alternative decoding by erasing information in components of at least one of the sidebands, starting from an outermost component of the at least one sideband, such that the alternative decoding results in an increase in an effective code rate of the inner code.

26. A method of processing received information corresponding to at least one frequency band in a communication system, the method comprising the steps of:

generating an error indicator characterizing interference associated with at least a portion of the frequency band; and     generating at least one decoding of the received information based at least in part on the error indicator;

wherein the received information includes an information signal encoded using an outer code and an inner code; and     wherein the at least one decoding is generated by eliminating from consideration in a receiver decoding process one or more subbands of a digital sideband associated with the frequency band, such that the at least one decoding results in an increase in an effective code rate of the inner code.

27. An apparatus for processing received information corresponding to at least one frequency band in a communication system, the apparatus comprising:

a receiver operative to generate an error indicator characterizing interference associated with at least a portion of the frequency band, and to generate at least one decoding of the received information based at least in part on the error indicator;

wherein the received information includes an information signal encoded using an outer code and an inner code; and     wherein the at least one decoding is generated by eliminating from consideration in a receiver decoding process one or more subbands of a digital sideband associated with the frequency band, such that the at least one decoding results in an increase in an effective code rate of the inner code.

* * * * *